United States Patent Office 3,529,920
Patented Sept. 22, 1970

3,529,920
PROCESS FOR DYEING SHAPED ARTICLES OF POLYACRYLONITRILE WITH CATIONIC DYESTUFFS
Klaus Walz, Leverkusen-Wiesdorf, Walter Hees, Cologne-Hohenberg, Helmut Kirschnek, Leverkusen, and Mathieu Quaedvlieg, Opladen, Germany, assignors to Farbenfabriken Bayer Aktiengesellschaft, Leverkusen, Germany, a corporation of Germany
No Drawing. Filed Aug. 14, 1967, Ser. No. 660,213
Claims priority, application Germany, Aug. 16, 1966, F 49,950; Mar. 25, 1967, F 51,940
Int. Cl. D06p 3/76
U.S. Cl. 8—4
2 Claims

ABSTRACT OF THE DISCLOSURE

A process for dyeing shaped articles of polyacrylonitrile with cationic dyestuffs in the presence of quaternary ammonium compounds having the formula:

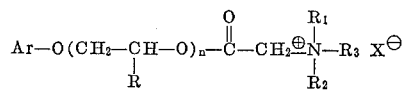

wherein Ar is a radical of the benzene or naphthalene series; R is hydrogen, methyl, or phenyl; $R_1$ and $R_2$ are alkyl radicals of 1–3 carbon atoms which may together form a closed ring; $R_3$ is an aliphatic, aromatic, cycloaliphatic, or araliphatic radical; $n$ is an integer of 0–4; and $X^\ominus$ is an anionic radical.

THE DISCLOSURE

The present invention relates to a process for dyeing shaped articles of polyacryonitrile with cationic dyestuffs in the presence of quaternary ammonium compounds; more particularly it concerns a process wherein as quaternary ammonium compounds colourless compounds of the formula

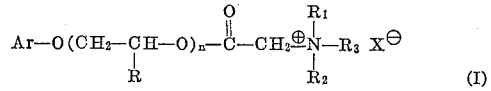

are present. In this formula Ar stands for a radical of the benzene or naphthalene series, which may contain 1–3 identical or different alkyl, cycloalkyl, aryl or aralkyl groups with up to 12 carbon atoms, R stands for hydrogen, a methyl or phenyl group, $R_1$ and $R_2$ stand for alkyl radicals which contain 1–3 carbon atoms and which may be closed to form a ring optionally containing further hetero atoms; $R_3$ stands for an aliphatic, aromatic, cycloaliphatic or araliphatic radical; $n$ stands for an integer from 0–4, and $X^\ominus$ represents an anionic radical, such as $Cl^\ominus$, $Br^\ominus$, $I^\ominus$, $CH_3OSO_3^\ominus$, $C_2H_5OSO_3^\ominus$, $$CH_3C_6H_4SO_3^\ominus$$

The compounds to be used according to the invention can be obtained by known methods, for example, by esterifying organic compounds of the formula

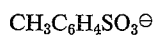

in which Ar and R have the same meaning as above, with monohaloacetic acids or monohaloacetic acid halides, and reacting the resultant haloacetic acid esters with amines of the formula

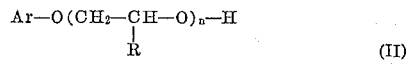

$R_1$–$R_3$ having the same meaning as above.

Examples of the hydroxyl group-containing compounds (II) are the following: iso-octylphenol, n-octylphenol, iso-nonylphenol, iso-dodecylphenol, n-dodecylphenol, diiso-butylphenol, triiso-butylphenol, 2-hydroxy-5-methyl-diphenylpropane, cyclohexylphenol, p-phenylphenol, dihexyl-phenol, phenylethylphenol, di(phenylethyl)-phenol, dibutylnaphthol, hexylnaphthol, octylnaphthol,, as well as products which can be obtained from these compounds by the reaction with alkylene oxides, such as ethylene oxide, propylene oxide, styrene oxide or butylene oxide, As amines (III) there may be mentioned, for example, trimethylamine, triethylamine, dimethyl-cyclohexylamine, dimethyl-benzylamine, methylpiperidine, methylmorpholine, N,N'-tetramethyl-propylene-diamine, tetramethyl-butylene-diamine, tetramethyl-hexamethylene-diamine, tetramethyl-hexahydrophenylene-diamine, N,N'-dimethylpiperazine. Suitable monohaloacetic acids are, for example, monochloroacetic acid or monobromoacetic acid, or their chlorides.

Products suitable for the process according to the invention are the following, for example, the butyl, hexyl, octyl, nonyl or dodecyl radicals of which may be straight-chain or branched:

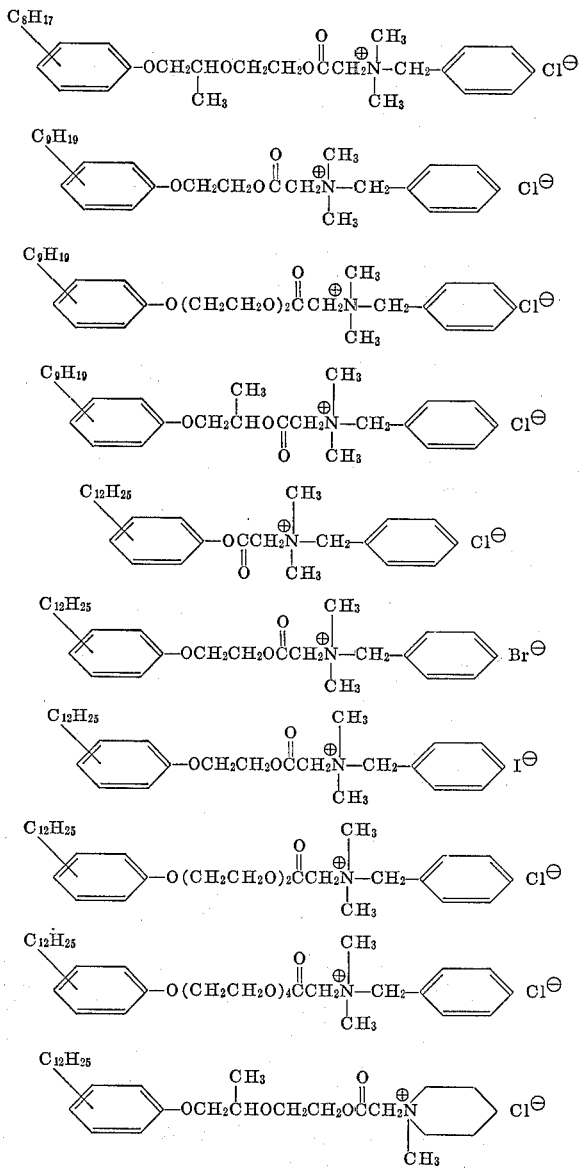

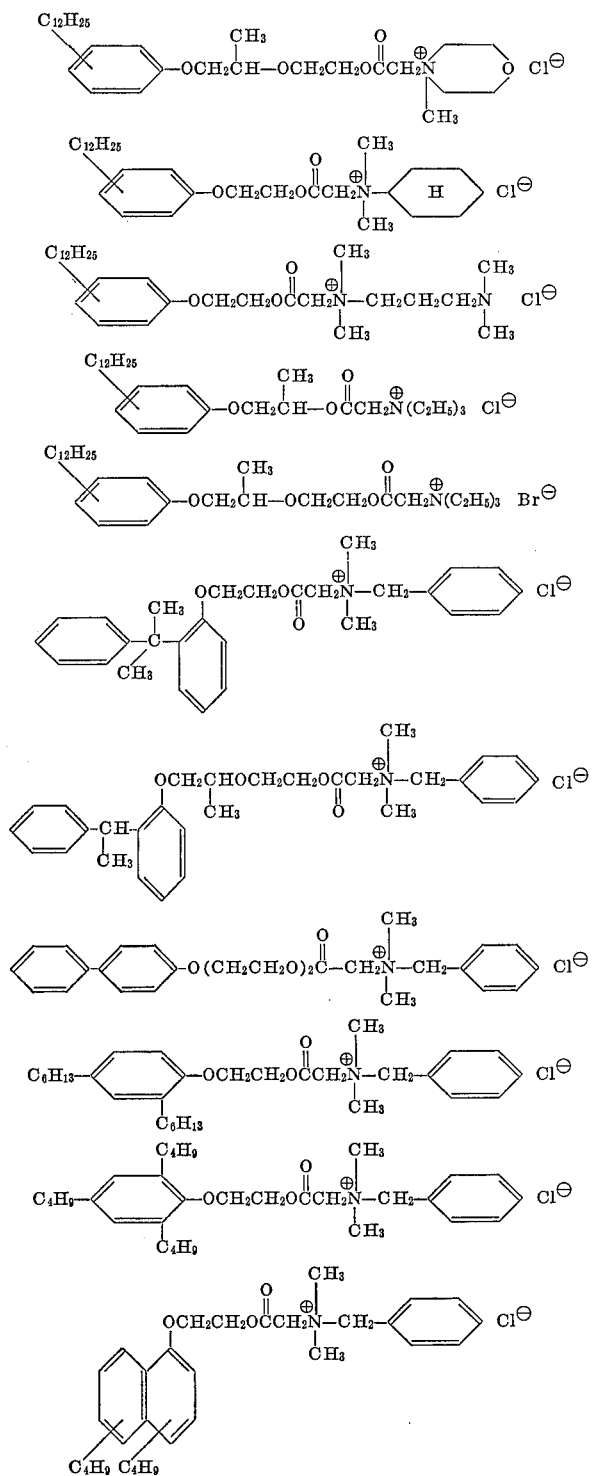

The necessary amounts of quaternary ammonium compounds of the Formula I can easily be determined by preliminary experiments. In general, amounts of 0.5–2.5%, calculated on the polyacrylonitrile shaped articles to be dyed prove to be sufficient. The cationic dyestuffs which are used for the process according to the invention can belong to groups of the greatest variety; suitable dyestuffs are, for example, diphenylmethane dyestuffs, triphenylmethane, dyestuffs, rhodamine dyestuffs, and onium-group-containing azo or anthraquinone dyestuffs, furthermore thiazine, oxazine, methine and azomethine dyestuffs (cf., for example, American Dyestuff Reporter, 1954, pages 432–433).

The dyeing of the polyacrylonitrile shaped articles can be effected in customary manner by introducing the goods to be dyed into an aqueous liquor which is heated to about 50–80° C. and contains a cationic dyestuff, a quaternary ammonium compound of the Formula I, furthermore salts, such as sodium acetate and sodium sulphate, as well as acids, such as acetic acid or formic acid, subsequently increasing the temperature of the dyebath to approximately 100° C. in the course of about 30 minutes, and then keeping the dyebath at this temperature until it is exhausted. Alternatively, the basic dyestuff can also be added later to the dyebath, for example, when the temperature of the bath has risen to about 60° C. Furthermore, the goods to be dyed can be pretreated at a temperature of 40–100° C. with a liquor which contains the customary salts and acids as well as a quaternary ammonium compound of the Formula I, but not yet any dyestuff, whereupon the dyestuff is subsequently added and the dyeing effected at 100° C. Finally, it is also possible to introduce the goods to be dyed immediately into the dyebath which is heated to approximately 100° C. and contains a quaternary ammonium compound of the Formula I.

With the aid of the present invention it is possible to dye with outstanding levelness shaped articles made of polyacrylonitrile of a most varied type, for example, cable sheathing filaments, flocks, combed materials, yarns, woven or knitted fabrics. Furthermore, it is noteworthy that the quaternisation products to be used according to the invention do not impair the affinity of the polyacrylonitrile shaped articles for cationic dyestuffs. In the present case, the term shaped articles made of polyacrylonitrile also includes those materials which, besides of acrylonitrile, are also produced with the use of other vinyl compounds, such as vinyl chloride, vinyl acetate, vinylidene chloride, vinylidene cyanide and acrylic acid alkyl ester.

The following examples serve to illustrate the invention without, however, limiting its scope.

EXAMPLE 1

A fabric of polyacrylonitrile fibres is introduced, in a goods-to-liquor ratio of 1:50, into a bath which is heated to 50° C. and contains, per litre, 0.006 g. of the diazotised dyestuff obtained from 4-anisdidine→1,3,3-trimethyl-2-methylene-indoline quaternised with dimethyl sulphate, 0.008 g. of the dyestuff obtained from diazotised 4-nitro-2-cyano-aniline→1-(dimethylamino-ethyl) - ethylamino-3-methyl-benzene quaternised with dimethyl sulphate, 0.0015 g. of the dyestuff 1-amino-4-(dimethylamino-methylanilido)-anthraquinone - hydrochloride, 0.0004 g. of the dyestuff Colour Index, 2nd edition, No. 51005, 0.1 g. sodium acetate, 2 g. sodium sulphate, 0.4 g. glacial acetic acid and 0.2 g. of the quaternary ammonium compound of the formula

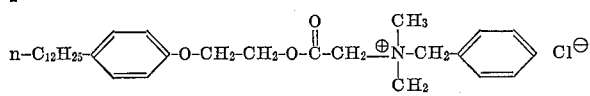

The bath is then slowly heated to 98° C. and kept at this temperature for about 60 minutes. A grey dyeing of outstanding levelness is obtained.

The same result is achieved when, instead of the aforementioned quaternary compound, the quaternary ammonium compound of the formula

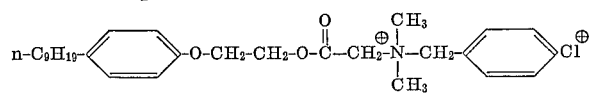

is used.

EXAMPLE 2

Yarns of polyacrylonitrile fibres are introduced, in a goods-to-liquor ratio of 1:40, into a bath which is heated to 80° C. and contains, per litre, 0.03 g. of the dyestuff 1-methylamino-4-(3'-dimethylamino - propylamino) - anthraquinone, 0.25 g. sodium acetate, 0.5 g. sodium sulphate, 0.5 g. glacial acetic acid and 0.4 g. of the quaternary ammonium compound of the formula

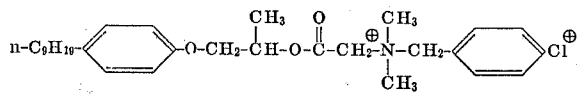

The bath is then slowly heated to 98° C. and kept at this temperature for 60 minutes. A pale blue dyeing of outstanding levelness is obtained.

EXAMPLE 3

Yarns of polyacrylonitrile fibres are introduced, in a liquor ratio of 1:40, into a bath which is heated to 60° C. and contains, per litre, 0.06 g. of the dyestuff No. 51005, Colour Index, 2nd edition, 0.25 g. sodium acetate, 0.4 glacial acetic acid and 0.25 g. of the quaternary ammonium compound

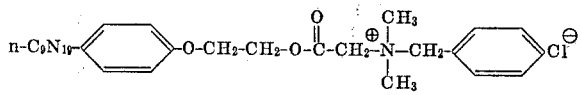

The bath is slowly heated to 98° C. and kept at this temperature for 60 minutes. A pale blue dyeing of outstanding levelness is obtained.

When, instead of the afore-mentioned quaternary ammonium compound, 0.25 g. of the quaternary ammonium compound of the formula

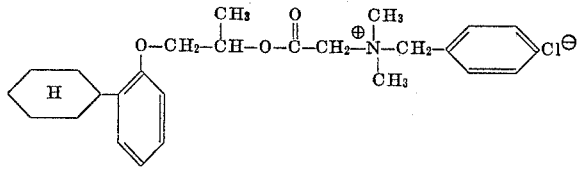

are used, a pale blue dyeing of outstanding levelness is also obtained.

We claim:
1. A process for dyeing shaped articles of polyacrylonitrile with cationic dyestuffs which comprises effecting the dyeing in the presence of colourless quaternary ammonium compounds of the formula

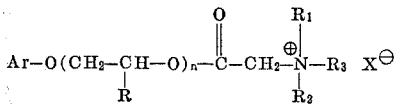

wherein Ar stands for a radical of the benzene or naphthalene series which may contain 1–3 identical or different alkyl, cycloalkyl, aryl or aralkyl groups with up to 12 carbon atoms, R stands for hydrogen, a methyl or a phenyl group, $R_1$ and $R_2$ stand for alkyl radicals which contain 1–3 carbon atoms and which may also be closed to form a ring optionally containing further hetero atoms, $R_3$ represents an aliphatic, aromatic, cycloaliphatic or araliphatic radical, $n$ stands for an integer from 0–4, and $X^\ominus$ is an anionic radical.

2. Shaped articles of polyacrylonitrile, dyed with cationic dyestuffs according to claim 1.

References Cited
UNITED STATES PATENTS 2,359,862  10/1944  Linch _____ 260—204

FOREIGN PATENTS 641,819  4/1964  Belgium.
1,123,286  2/1962  Germany.

GEORGE F. LESMES, Primary Examiner

T. J. HERBERT, Jr., Assistant Examiner

U.S. Cl. X.R.

8—84, 172, 177